UNITED STATES PATENT OFFICE.

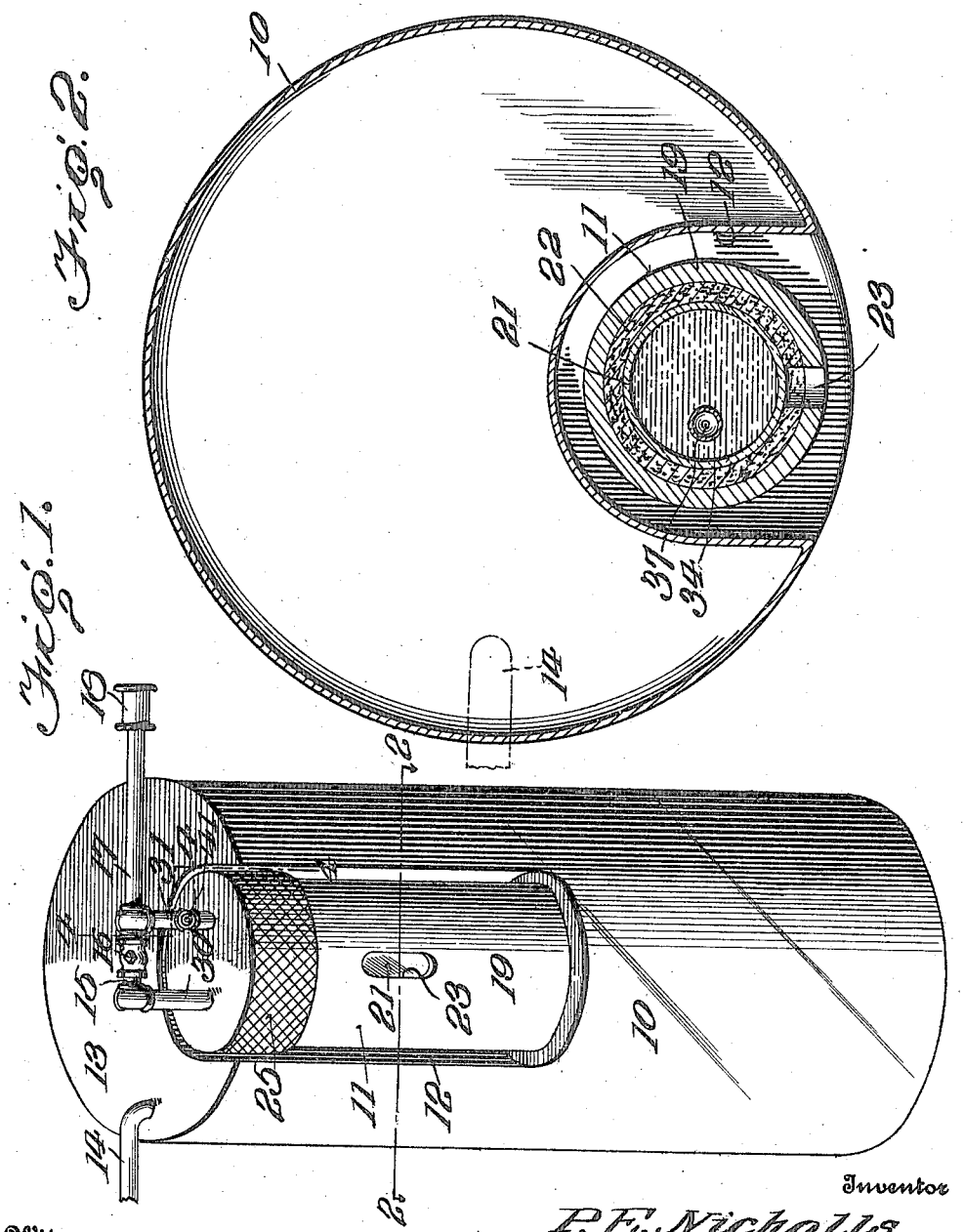

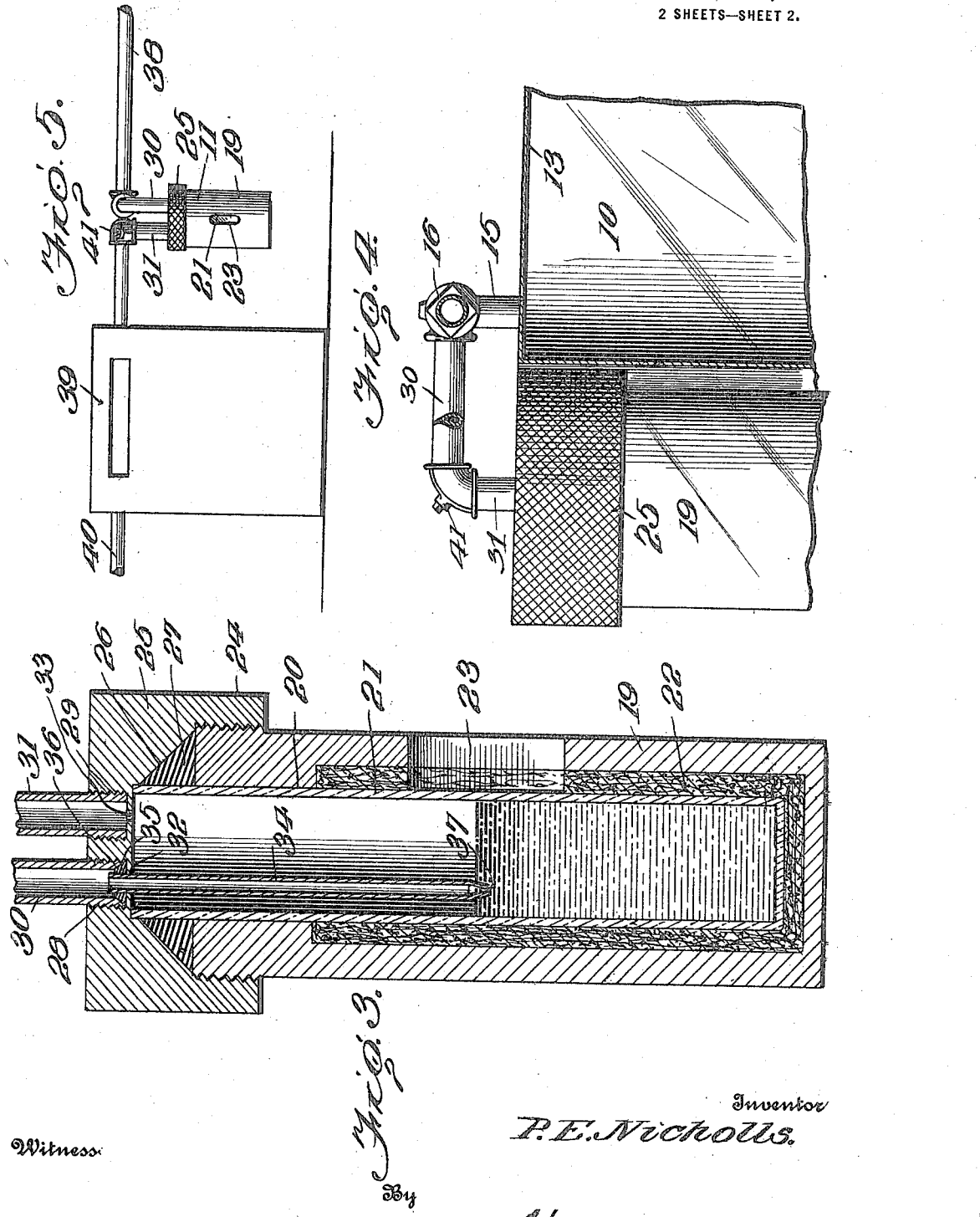

PAUL E. NICHOLLS, OF GALVESTON, TEXAS.

TESTER FOR PIPE SYSTEMS.

1,187,646.  Specification of Letters Patent. Patented June 20, 1916.

Application filed July 6, 1915. Serial No. 38,335.

*To all whom it may concern:*

Be it known that I, PAUL E. NICHOLLS, a citizen of the United States, residing at Galveston, in the county of Galveston and State of Texas, have invented certain new and useful Improvements in Testers for Pipe Systems, of which the following is a specification.

My invention relates to new and useful improvements in testing devices, the primary object of my invention being the provision of a device for testing the tightness of pipe systems and one which will be capable of a wide range of use.

More specifically, my invention consists in the provision of a mechanism which may be employed to test a pipe system before the latter is put in use or to test a gas conducting system while the system is in use.

A still further object of my invention consists in providing a device of the above described character including a telltale mechanism or device adapted for connection with the pipes of the system to be tested and so arranged that changes in pressure in the system, if the latter is in operation, will be indicated.

A still further object of my invention is to provide, in connection with the telltale device, a compression tank which may be put in communication with the system in order that the system may be filled with air or other suitable gas, under pressure, and any leak therein thereby determined by means of the telltale.

With these and other objects in view, my invention will be more fully described, illustrated in the accompanying drawings, and then specifically pointed out in the claims which are attached to and form a part of this application.

In the drawings: Figure 1 is a perspective view of my improved testing device; Fig. 2 is a transverse sectional view taken on the line 2—2 of Fig. 1; Fig. 3 is a vertical sectional view of the telltale device; Fig. 4 is a fragmentary sectional view taken on the line 4—4 of Fig. 1; Fig. 5 is a fragmentary elevational view, illustrating the method of employing my telltale in testing pipe systems, while the latter are in use.

Corresponding and like parts are referred to in the following description and indicated in all the views of the drawings by the same reference characters.

My invention broadly comprehends a compression tank, indicated as a whole by the numeral 10 and a telltale device 11. The tank 10 is formed adjacent its upper end with a seat 12 to support the telltale device which is cylindrical in shape in order that the entire testing mechanism may occupy as little space as possible. It will of course be understood, however, that this arrangement is not at all essential to the effective operation of the tester. The top 13 of the tank is provided with a pipe 14 leading from the tank and adapted for connection with any suitable form of pump, not shown, by means of which air or other gas may be forced into the tank, under pressure. A second pipe 15 also communicates with the tank through the top thereof and is connected to a manually operable cut-off cock 16 from which a pipe 17 leads, this pipe, at its end, being provided with any suitable type of coupling 18 by means of which it may be connected to the intake end of a pipe system to be tested.

The telltale device includes a cylindrical body portion 19, preferably formed of metal with a restricted throat portion 20. Extending loosely within this body portion is a glass tube 21 surrounded by any suitable form of packing 22 and extending at its upper end through the top of the casing 19. The casing 19 is provided at one side with a vertically disposed slot 23 and the packing opposite this slot is omitted in order that the tube may be clearly exposed to view. The upper end of the casing 19 is threaded to receive the threaded flange 24 of a cap 25, the inner face of which is beveled, as shown at 26, to engage against the correspondingly beveled face of a rubber packing ring 27 in order that the cap, when turned home, may wedge the packing ring against the outer wall of the upper end of the tube 21 and so prevent any possibility of leakage from the tube. The cap above the tube is provided with threaded sockets 28 and 29, a pipe 30 engaging at one end in the socket 28 and being connected to the pipe 15, and a pipe 31 being threaded in the other socket and connected to the pipe 17. The cap is provided with a port 32 and a port 33 establishing communication between the tube 20 and the pipes 30 and 31. A relatively small tube 34, of any suitable material, but preferably glass, extends at its upper end through the port 32 and is surrounded by a rubber packing ring 35 seated in the lower end of the socket 28 and forced into engagement with the tube by the beveled lower end 36 of the pipe 30 to form an air tight joint. Preferably, the lower end of the tube 34 is drawn out to provide a reduced nozzle 37 which is disposed substantially midway of that portion of the tube 20 at the rear of the slot 23 of the casing 19. Normally the tube 20 is filled with water or other suitable liquid to a level slightly above the nozzle 37 in order that any air or other gas passing downwardly through the nozzle 37 may create bubbles in the liquid contained in the tube 20, which bubbles will be exposed to sight through the slot 23 of the casing 19.

In operation, the device is connected to the pipe system to be tested by means of the coupling 18, the cock 16 is opened, and the pump, not shown, is operated to create a pressure of five, ten or fifteen pounds, as deemed advisable under the circumstances, in both the tank 10 and pipe system being tested, after which the cut-off cock 16 is closed. It will be apparent that at this time the liquid in the tube 20 of the telltale device is subject to the air pressure confined in the pipe system and that the tube 34 is in direct communication with the pressure tank 10, which in turn is cut-off from the pipe system. It will therefore be clear that if the pressure in the pipe system falls, due to leakage therefrom, the pressure above the liquid in the tube 20 will be reduced below that in the pressure chamber or tank 10 with the result that air will be forced through the tube 34 and nozzle 36, creating bubbles in the tube 20 which may be readily discerned through the opening or slot 23. If, on the other hand, the pipe system being tested is absolutely tight, no bubbles will be formed. It will of course be clear that the size of the bubbles formed and the rapidity of their formation will be a rough indication of the extent of the leak or leaks in the pipe system.

In order to use the device with a pipe system which is in use, I have illustrated it in connection with an ordinary gas pipe system including the gas supply pipe 38, meter 39, and pipe 40 forming a part of the pipping system of a house, reference being had particularly to Fig. 4 of the drawings. When the tester is to be used for such a purpose, the telltale device is disconnected from the tank 10 and the pipes 30 and 31 cut into the gas supply pipe 38. Under these circumstances, if the pipe system 40 is tight, the gas pressure from the system 40, in the space above the liquid in the tube 20, will be the same as the pressure in the gas supply pipe 38 and no bubbles will be formed in the pipe 20. If, however, there is a leak in the piping of the house, it will be clear that the pressure in the pipe 20 above the liquid will be correspondingly reduced and fresh gas from the supply pipe 38 will flow through the tube 34 and nozzle 37 to replace the loss, such flow being clearly indicated by the formation of bubbles, as previously explained. It will therefore be clear that I have provided a pipe testing device which is very delicate in its action, simple in construction and readily employable for a vast number of different purposes.

As a means for supplying water to the glass tube 21, I provide the pipe 31 with a T-coupling and plug 41.

I do not wish to be limited to the specific details of construction, illustrated and described, but reserve the right to make any changes, within the scope of the appended claims, without in the slightest degree departing from the spirit of the invention.

Having thus described the invention, what is claimed as new is:

1. A device for testing pipe systems including a transparent closed container partially filled with a liquid, a nozzle extending through the container to a point below the liquid level, a pipe communicating with the container above the liquid level and adapted for connection with the system being tested, means for supplying a gas under pressure to the system being tested and to the nozzle, whereby both pressures will be the same, and means for cutting off communication between the nozzle and pipe leading from the container, save for the liquid seal of the nozzle.

2. A device for testing pipe systems including a compression tank, means for supplying air under pressure to the tank, a transparent container adapted to be partially filled with a liquid, a nozzle extending into the container and below the liquid level thereof, a pipe leading from the nozzle, a second pipe communicating with the container above the liquid level thereof, a pipe communicating with the compression tank and with both the first named pipes and adapted for connection with the system being tested, and a cut-off valve in said latter pipe between the first named pipes.

3. A device for testing pipe systems including a compression tank, means for supplying air under pressure to the tank, a pipe leading from the tank and adapted for connection with the system being tested, a cut-off valve in said pipe, a transparent closed container adapted to be partially filled with liquid, a nozzle leading from the pipe at a point between the tank and valve and projecting into the container to a point below the liquid level therein, and a pipe leading from the first pipe at a point beyond the cut-off valve into the container at a point above the liquid level therein.

4. A device for testing pipe systems including a compression chamber provided exteriorly with a seat, means for supplying air under pressure to the chamber; a pipe leading from the chamber, a cut-off valve in the pipe, a casing positioned in the seat of the chamber and provided with an opening in its side wall, a glass tube located in the casing, a cap closing the upper end of the casing, a gasket interposed between the cap and tube to seal the latter, openings formed in the cap, a nozzle extending through one of the openings, sealed therein and projecting to a point opposite the side opening of the casing, and pipes leading from the openings in the cap and adapted for connection to the pipe leading from the compression chamber, that pipe leading from the nozzle being connected to the pipe leading from the compression chamber at a point between the chamber and cut-off valve and the other pipe leading from the casing being connected to the pipe leading from the compression chamber a point beyond the cut-off valve.

5. A device for testing pipe systems including a sealed transparent container adapted to be partially filled with a liquid, pipes communicating with the upper end of the container and adapted for connection in a pipe of the system to be tested, and a nozzle extending from one of the pipes to a point below the liquid level of the container.

6. A device for testing pipe systems including a sealed transparent container adapted to be partially filled with a liquid, pipes communicating with the upper end of the container and adapted for connection in a pipe of the system to be tested, a nozzle extending from one of the pipes to a point below the liquid level of the container, and a casing inclosing the container and provided with a slot opening opposite the liquid level thereof.

7. A device for testing pipe systems including pipes, each having one end adapted for communication with the system to be tested whereby the pipes will form a non-terminal portion of the system being tested, and a liquid sealed device interposed between the other ends of the pipes.

In testimony whereof I affix my signature in presence of two witnesses.

PAUL E. NICHOLLS. [L. S.]

Witnesses:
L. P. LEITH,
CHAS. S. FRENCH.

Copies of this patent may be obtained for five cents each, by addressing the "Commissioner of Patents, Washington, D. C."